L. E. STRENG.
CORN HUSKING MACHINE.
APPLICATION FILED JULY 23, 1910.
1,020,326.
Patented Mar. 12, 1912.
4 SHEETS—SHEET 1.
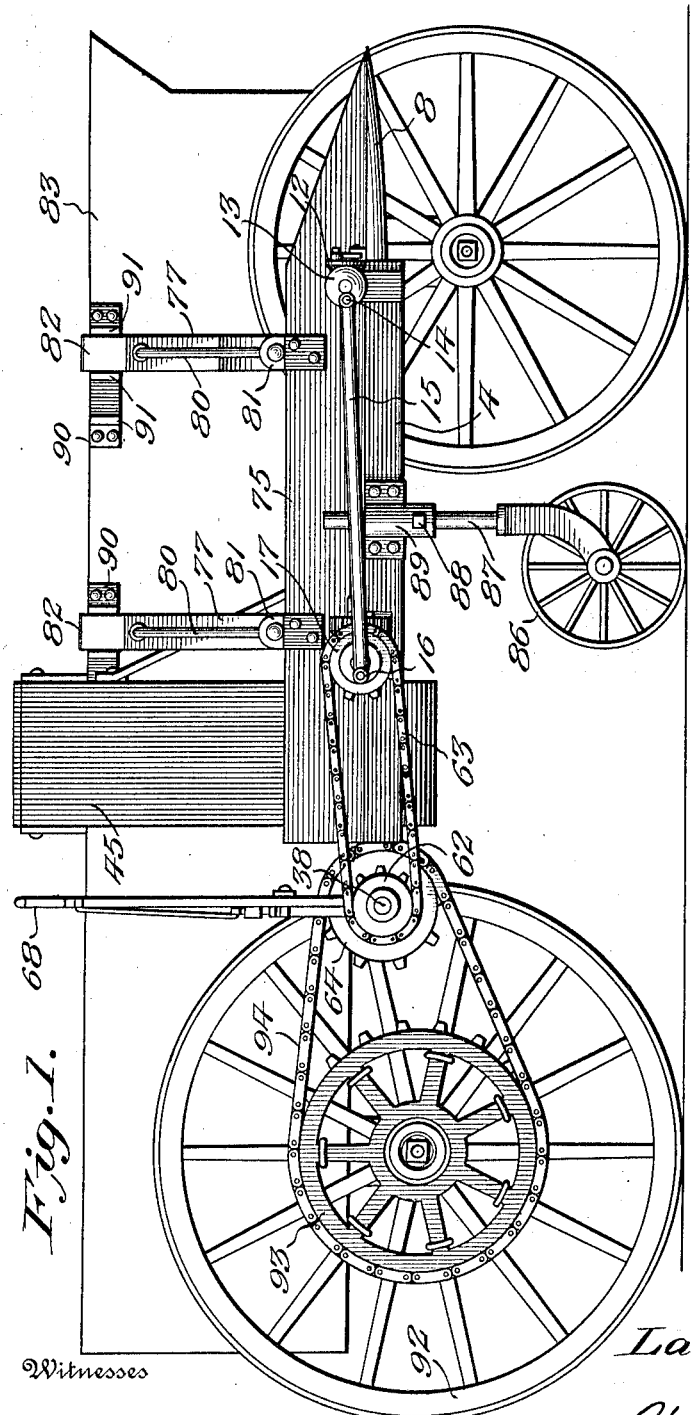
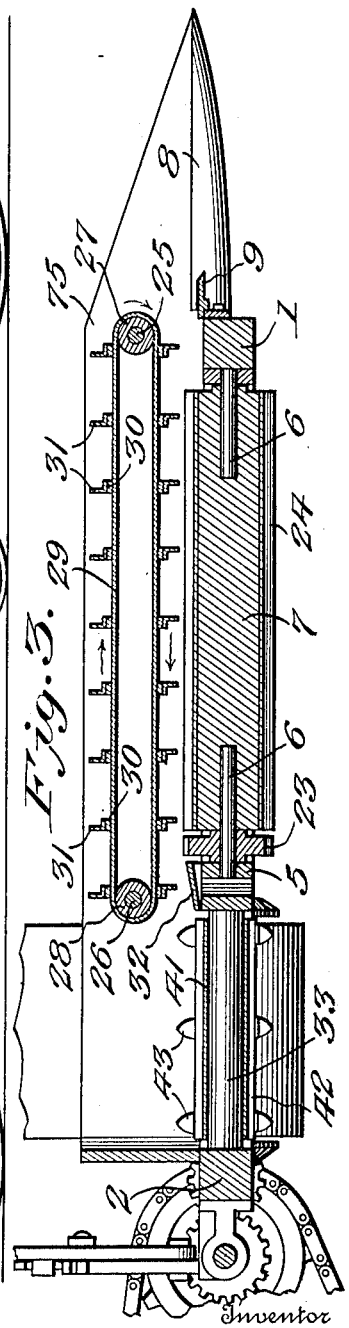

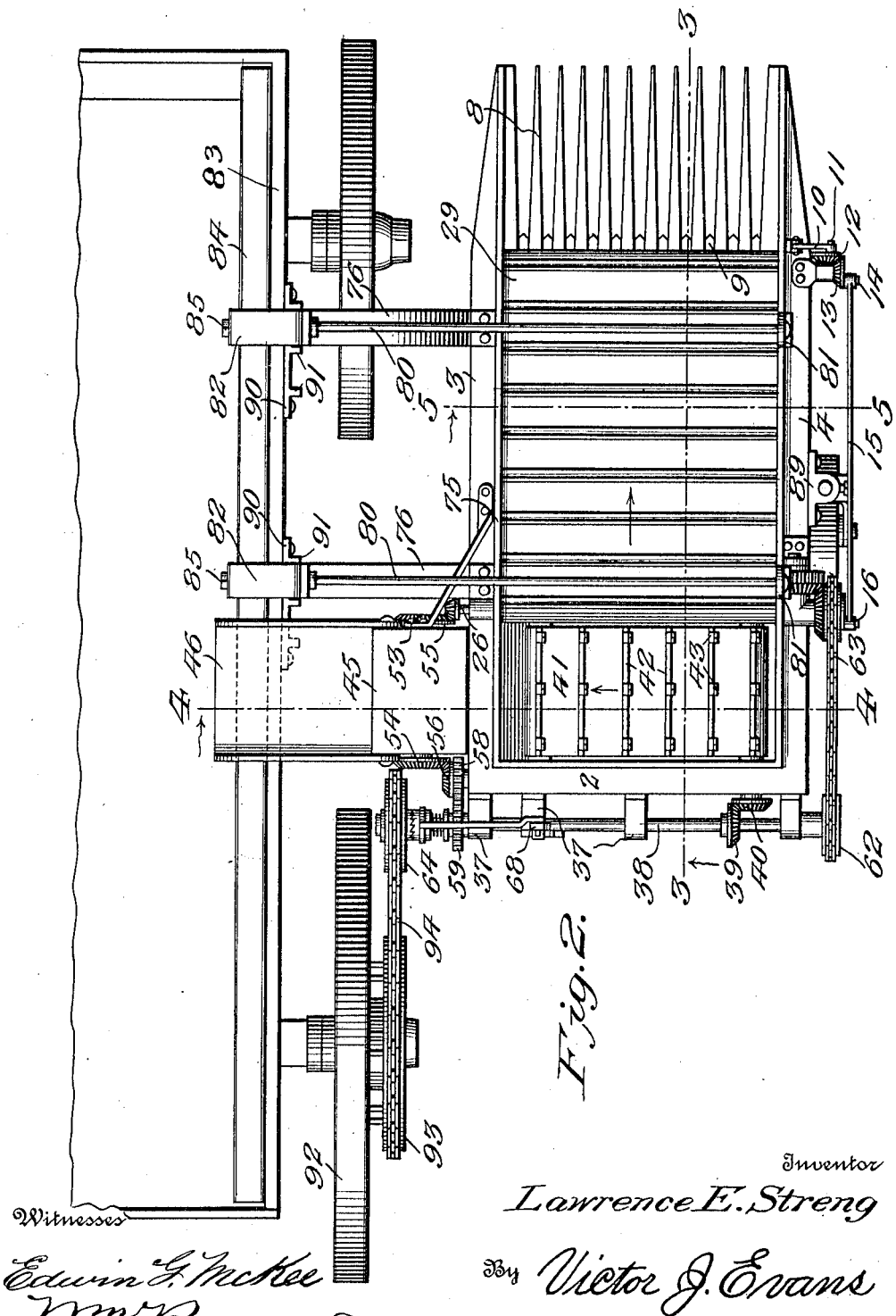

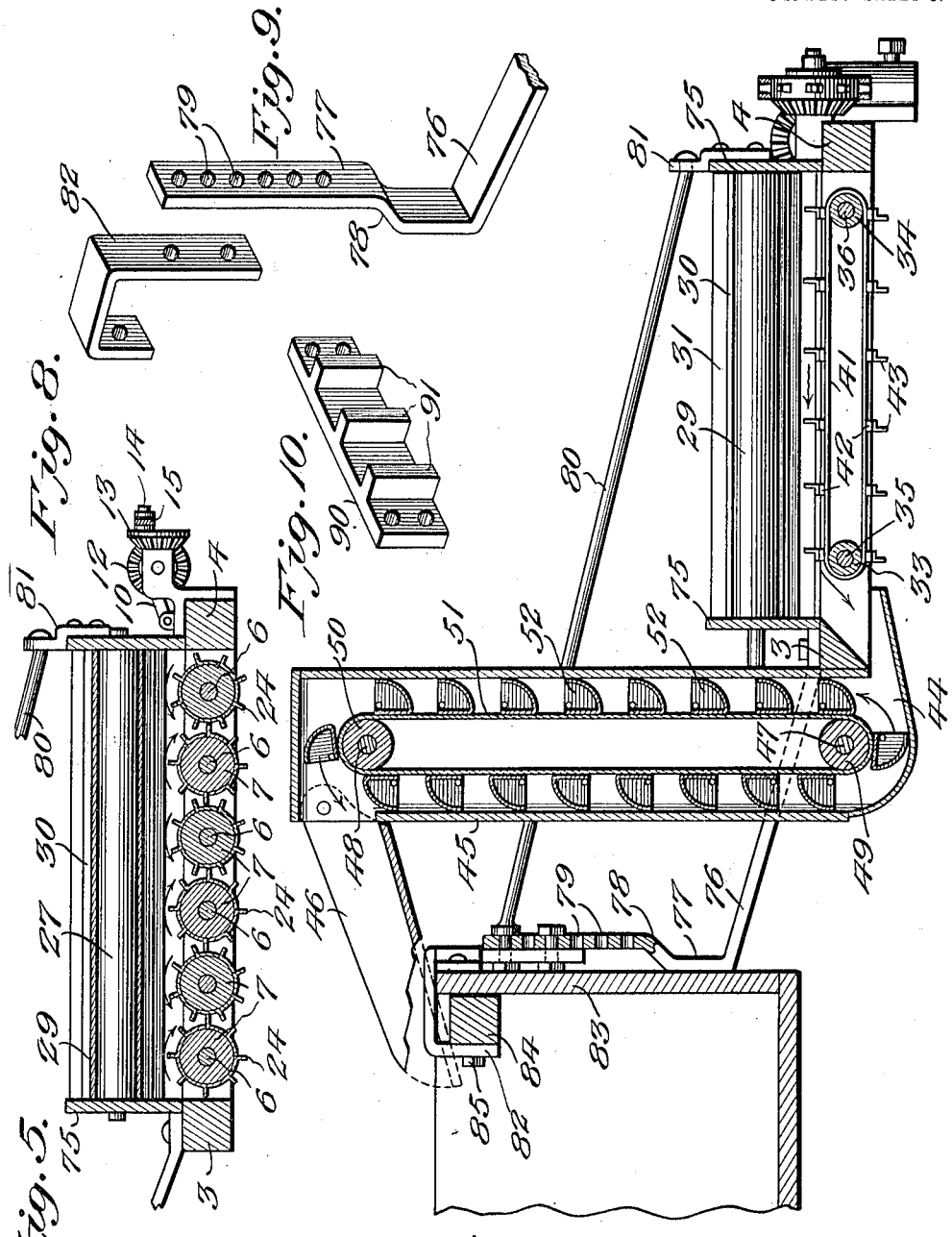

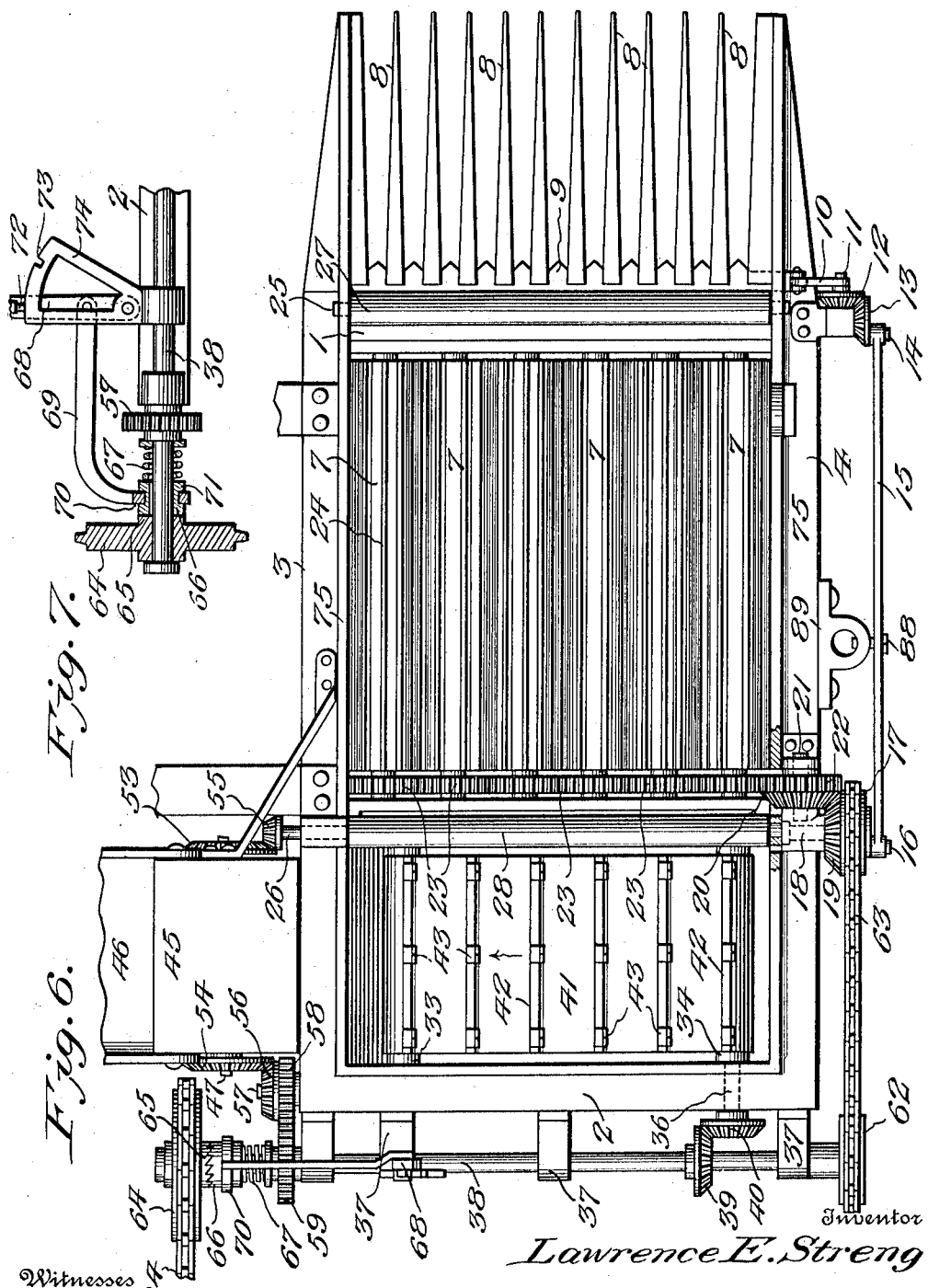

UNITED STATES PATENT OFFICE.

LAWRENCE E. STRENG, OF NEW PALESTINE, INDIANA.

CORN-HUSKING MACHINE.

1,020,326.  Specification of Letters Patent.  Patented Mar. 12, 1912.

Application filed July 23, 1910. Serial No. 573,452.

*To all whom it may concern:*

Be it known that I, LAWRENCE E. STRENG, a citizen of the United States of America, residing at New Palestine, in the county of Hancock and State of Indiana, have invented new and useful Improvements in Corn-Husking Machines, of which the following is a specification.

This invention relates to corn husking machines of that class which are adapted to gather the corn in the field, to strip the husks from the ears and to discharge the ears into a wagon box or similar receptacle.

The invention has for its object to provide a machine of simple and improved construction which may be readily attached to an ordinary farm wagon and operated by power supplied from one of the transporting wheels of said wagon.

Further objects of the invention are to simplify and improve the construction and operation of a machine of the class referred to.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention, may be resorted to when desired.

In the drawings,—Figure 1 is a side elevation showing a machine constructed in accordance with the invention attached to an ordinary farm wagon in position for operation. Fig. 2 is a top plan view of the same. Fig. 3 is a longitudinal sectional view taken on the line 3—3 in Fig. 1. Fig. 4 is a transverse sectional view taken on the line 4—4 in Fig. 1. Fig. 5 is a transverse sectional view taken on the line 5—5 in Fig. 1. Fig. 6 is a top plan view, showing the corn husking machine on a larger scale detached from the wagon and the endless conveyer being removed. Fig. 7 is a detail view in sectional elevation, showing the clutch means for transmitting motion to the husking machine. Figs. 8, 9 and 10 are detail views of the parts constituting the means for mounting the husking machine upon a farm wagon in position for operation.

Corresponding parts in the several figures are denoted by like characters of reference.

The improved corn husking machine includes a frame structure which is mainly of rectangular shape, said frame including the front and rear bars 1 and 2 and the side bars 3 and 4 of which the former, which in practice adjoins the box of the wagon in connection with which the machine is used, is distinguished as the inner side bar, while the bar 4 will for convenience be called the outer side bar. The side bars 3 and 4 are connected intermediate their ends by a cross bar 5 which, together with the front bar 1, affords bearings for the shafts 6 carrying the husking rolls 7.

Mounted upon the front frame bar 1 and coöperating with the guard fingers 8 which extend forwardly therefrom is a reciprocatory cutter bar 9, one end of which is connected by a link or pitman 10 with a wrist pin 11 upon a bevel pinion 12 which is supported for rotation in mesh with a corresponding bevel pinion 13 having a wrist pin 14 which is connected by a link or connecting rod 15 with a wrist pin 16 upon a sprocket wheel 17 carried by a shaft 18 which is supported for rotation in rear of the husking rolls. The shaft 18 carries a bevel gear 19 meshing with a bevel gear 20 upon an idler shaft 21 having a pinion 22. The husking rolls are provided at their rear ends with intermeshing pinions 23, one of which is in mesh with the pinion 22 from which the series of husking rolls will thus be driven. The husking rolls 7 are provided with longitudinally disposed ribs or flanges 24 which, when the machine is in action, will serve to seize the husks and stems, and such bits of stalk as adhere to and have been detached with the stems, stripping the same from the ears and discharging them upon the ground below.

Supported for rotation in the frame adjacent to the front and rear ends of the husking rolls 7 in a plane slightly above said rolls are shafts 25, 26 carrying cylindrical rolls 27, 28 serving to support an endless conveyer consisting of an apron 29 equipped with transversely disposed slats or cleats 30 upon which L-shaped ribs 31 are mounted, as will be best seen by reference to Fig. 3 of the drawings. This conveyer serves to carry material from the cutting apparatus rearwardly over the husking rolls, thus causing the husks to be stripped from the ears and the latter to be discharged over the rear ends of the husking rolls where an inclined guide plate 32 is arranged, as will be best seen in Fig. 3.

The rear bar 2 and the transverse bar 5 of the frame are provided with bearings for cylindrical rollers 33 and 34 which may be mounted upon suitable shafts 35, 36, as best seen in Fig. 4. Brackets 37 upon the rear frame bar 2 afford bearings for a shaft 38 having a bevel gear 39 meshing with the bevel gear 40 upon the shaft 36. An endless conveyer consisting of an apron 41 having cleats 42 provided with upstanding teeth or lugs 43 is mounted upon the rolls 33, 34 and is driven from the shaft 38 in the direction indicated by a dart in Fig. 6. This conveyer receives the husked ears that are discharged over the rear ends of the husking rolls and over the guide plate 32 and carries them to the receiving chute 44 of an elevator comprising a casing 45 having a discharge chute 46 and provided adjacent to its lower and upper ends with shafts 47, 48 carrying rollers 49, 50 over which an endless belt or apron 51 is guided, said belt or apron being equipped with elevator buckets 52 of suitable construction. The lower elevator shaft 47 is provided at the ends thereof with bevel gears 53 and 54, the former of which meshes with a bevel pinion 55 upon the conveyer shaft 26 which is thus driven. The bevel gear 54 meshes with a pinion 56 upon an idler shaft 57 carrying also a spur wheel 58 meshing with a spur gear 59 upon the shaft 38 from which motion will thus be transmitted to the elevator, and from the latter to the conveyer including the endless apron 29 above the husking rolls.

The shaft 38 has a sprocket wheel 62 which is connected by a chain 63 with the sprocket wheel 17 from which motion is transmitted to the husking rolls and to the cutting apparatus by the means hereinbefore described.

The shaft 38 carries a loose sprocket wheel 64 having a clutch member 65 adapted to coöperate with a slidable clutch member 66 which is keyed or feathered upon said shaft 38 and which is actuated by a spring 67, whereby it is normally kept in engagement with the clutch member 65. The clutch member 66, however, may be thrown out of engagement with the clutch member 65 by means of a shipping lever 68 with which is pivotally connected one end of a link 69 having at the other end a ring or band 70 engaging an annular groove 71 in the clutch member 66, as will be best seen in Fig. 7 of the drawings. The shipping lever is provided with a stop member 72 capable of engaging a notch 73 in a segment member 74 when it shall be desired to hold the clutch out of gear against the tension of the spring 67.

The sides of the frame are provided with upstanding flanges 75 to prevent material from being spilled over the sides, and the inner side member of the frame is provided with laterally extending arms or brackets 76 having upstanding arms 77 which are offset, as shown at 78, and which are provided with series of apertures 79, one of which receives one end of a brace 80 that extends transversely across the frame of the machine, the outer ends of said braces being connected with upstanding brackets 81 upon the outer portion of the frame. Adjustably connected with the upper ends of the arms 77 are hook members 82, whereby the machine may be hung and supported upon the side of a wagon box, as clearly seen in Figs. 1, 2 and 4. The sideboard 83 of the wagon box is reinforced adjacent to its upper edge by a longitudinally disposed cleat or scantling 84 which may be bolted upon or otherwise secured upon the hook members by fastening means, as indicated at 85 in Fig. 4, thus preventing the sideboard of the wagon from sagging or yielding under the weight. The weight, however, is partly relieved by a caster wheel 86 having a shank 87 which is adjustably mounted by means of a set screw 88 in a box 89 secured upon the outer side of the frame. The improved machine will thus be firmly and securely mounted in operative position upon the side of a wagon box. To prevent longitudinal displacement it is preferred to secure upon the outer face of the sideboard 83 engaging members consisting of plates 90, each having a plurality of cleats or flanges 91 between which the hooks or supporting members 82 may be adjusted, thus providing for the adjustment of the husking machine longitudinally of the wagon box to suit various conditions, and also providing against longitudinal displacement of the machine when mounted in position for operation.

Upon one of the rear driving wheels 92 of the wagon in connection with which the machine is to be used, there is suitably clamped a sprocket wheel 93 which is connected by a chain 94 with the sprocket wheel 64 upon the main driving shaft 38 of the machine to the moving parts of which motion will thus be transmitted when the device is in operation.

From the foregoing description, taken in connection with the drawings hereto annexed, the operation and advantages of this invention will be readily understood by those skilled in the art to which it appertains.

The machine may be easily and quickly mounted in position upon any ordinary farm wagon, the latter being simply equipped with the retaining plates 90 and with the sprocket wheel 93, the latter being mounted upon one of the transporting wheels so that the machine may be readily lifted and transferred from one wagon to another. When the wagon is drawn over the field a row of corn is engaged by the guard fingers which will coöperate with the cutting apparatus to strip the ears from the stalks, the ears being carried rearwardly over the husking rolls by the conveyer including the apron 29. The ribs or flanges upon the husking rolls will seize hold of the husks, stripping the latter from the ears and discharging the husks and bits of stalk upon the ground, while the ears are carried rearwardly by means of the conveyer overlying the husking rolls and discharged upon the transversely arranged conveyer in rear of the husking rolls, the ears being thereby transferred to the elevator, whereby they are elevated and eventually discharged into the wagon box.

By the supporting bar 77 the device may be adjusted vertically, thus enabling it to be lowered to such an extent as to operate successfully upon down corn, the ears of which are within a short distance of the ground. When the corn is standing, the device may be elevated, as will be readily understood, to the position in which it shall be found to operate most efficiently.

Having thus described the invention, what is claimed as new, is:—

1. In a device of the character described, a frame including side members, front and rear cross bars and an intermediate cross bar, guard fingers extending forwardly from the front cross bar, a cutter bar supported adjacent to the front cross bar, husking rolls supported upon the front and intermediate cross bars and having intermeshing gears, a driven shaft 18 having a bevel pinion 19 and a sprocket wheel whereby it receives motion from a source of power, an idler shaft having a bevel pinion meshing with the pinion 18 and a gear wheel meshing with one of the intermeshing gears of the husking rolls, intermeshing bevel gears 12, 13, the former of which has a wrist pin and a pitman connecting said wrist pin with the cutter bar, a rod connecting the bevel gear 13 with the sprocket wheel upon the driven shaft 18, and means for mounting and supporting the frame upon the box of an ordinary farm wagon.

2. In a device of the character described, a rectangular frame comprising side members, front and rear cross bars and an intermediate cross bar, husking rolls supported upon the front and intermediate cross bars and having intermeshing gears, finger bars extending forwardly from the front cross bar, a cutter bar coöperating with the finger bars, longitudinally disposed shafts supported upon the rear and intermediate cross bars, an endless conveyer supported upon said shafts, roller-carrying shafts supported above and adjacent to the intermediate and front cross bars, an endless conveyer guided over said rollers with its lower lead in proximity to the husking rolls, an elevator supported adjacent to the inner cross bar of the frame to receive material discharged over the endless conveyer supported upon the shafts journaled upon the rear and intermediate cross bars of the frame, a driven shaft supported behind and adjacent to the rear cross bar, means for transmitting motion from one end of said shaft to the husking rolls and to the cutting apparatus, means for transmitting motion from the other end of said shaft to the elevator and from the latter to the endless conveyer disposed above and adjacent to the husking rolls, means for transmitting motion from an intermediate portion of the driven shaft to the transverse conveyer between the rear and intermediate cross pieces of the frame, means for supporting the frame upon the box of an ordinary farm wagon, and means for transmitting motion from a wheel of said wagon to the driven shaft.

3. In a device of the class described, a frame carrying stripping means, husking means and conveying means, brackets extending from said frame and having upstanding arms, upstanding brackets upon the outer side of the frame, braces connecting the upstanding arms with the upstanding brackets, hook members connected adjustably with the upstanding arms, and a cleat or scantling secured upon the hook members in longitudinal relation to the frame.

4. In a device of the character described, a frame equipped with stripping means, husking means and an elevator, brackets extending from the inner side of the frame and having upstanding arms, upstanding brackets upon the outer side of the frame, braces connecting the upstanding arms with the upstanding brackets, and hook members connected adjustably with the upstanding brackets; in combination with a wagon, the box of which is provided with plates secured upon the sideboard thereof, said plates having hook engaging ribs, and means for transmitting motion from a wagon wheel to the moving parts of the device.

In testimony whereof I affix my signature in presence of two witnesses.

LAWRENCE E. STRENG.

Witnesses:
ADAM P. HOGLE,
EMMA STRENG.

Copies of this patent may be obtained for five cents each, by addressing the "Commissioner of Patents, Washington, D. C."